J. H. McKELVEY AND C. F. RYAN.
PROCESS OF MAKING PLATE GLASS.
APPLICATION FILED APR. 12, 1915.
1,397,287.
Patented Nov. 15, 1921.
5 SHEETS—SHEET 2.
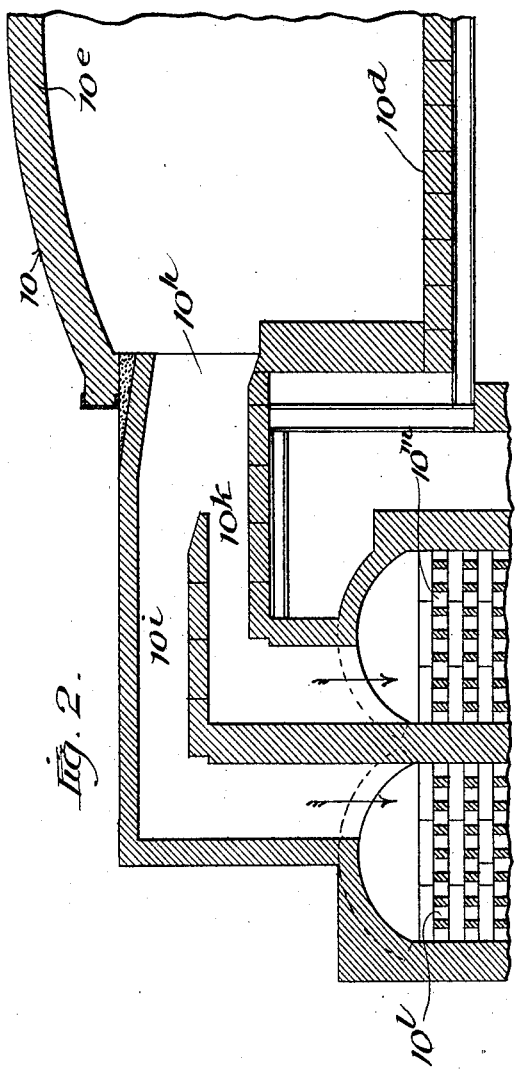
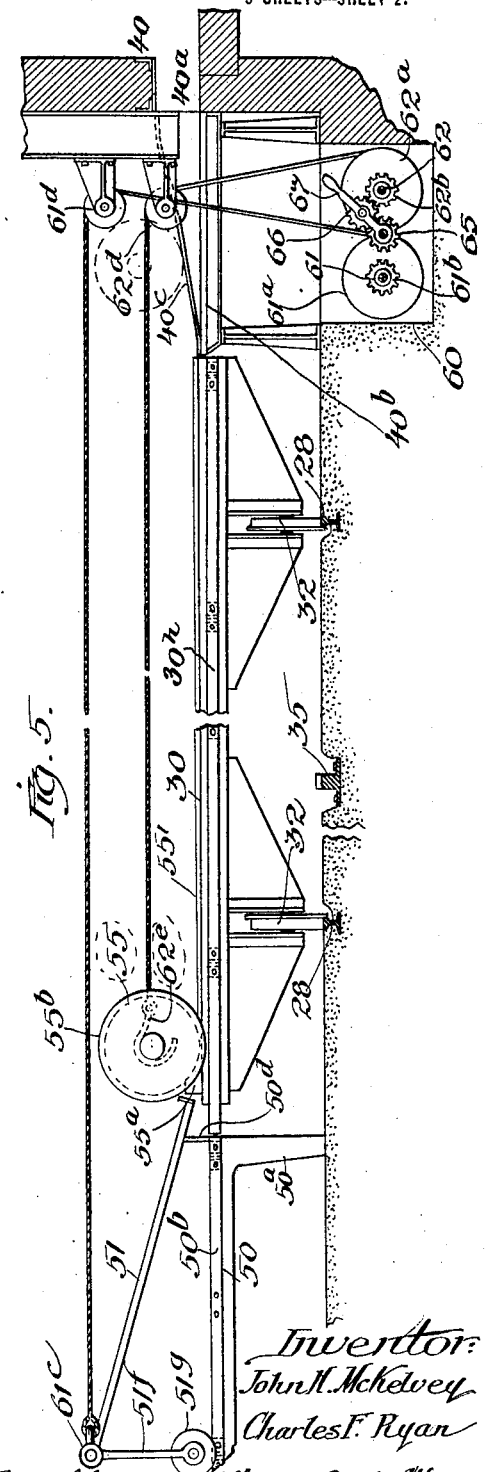

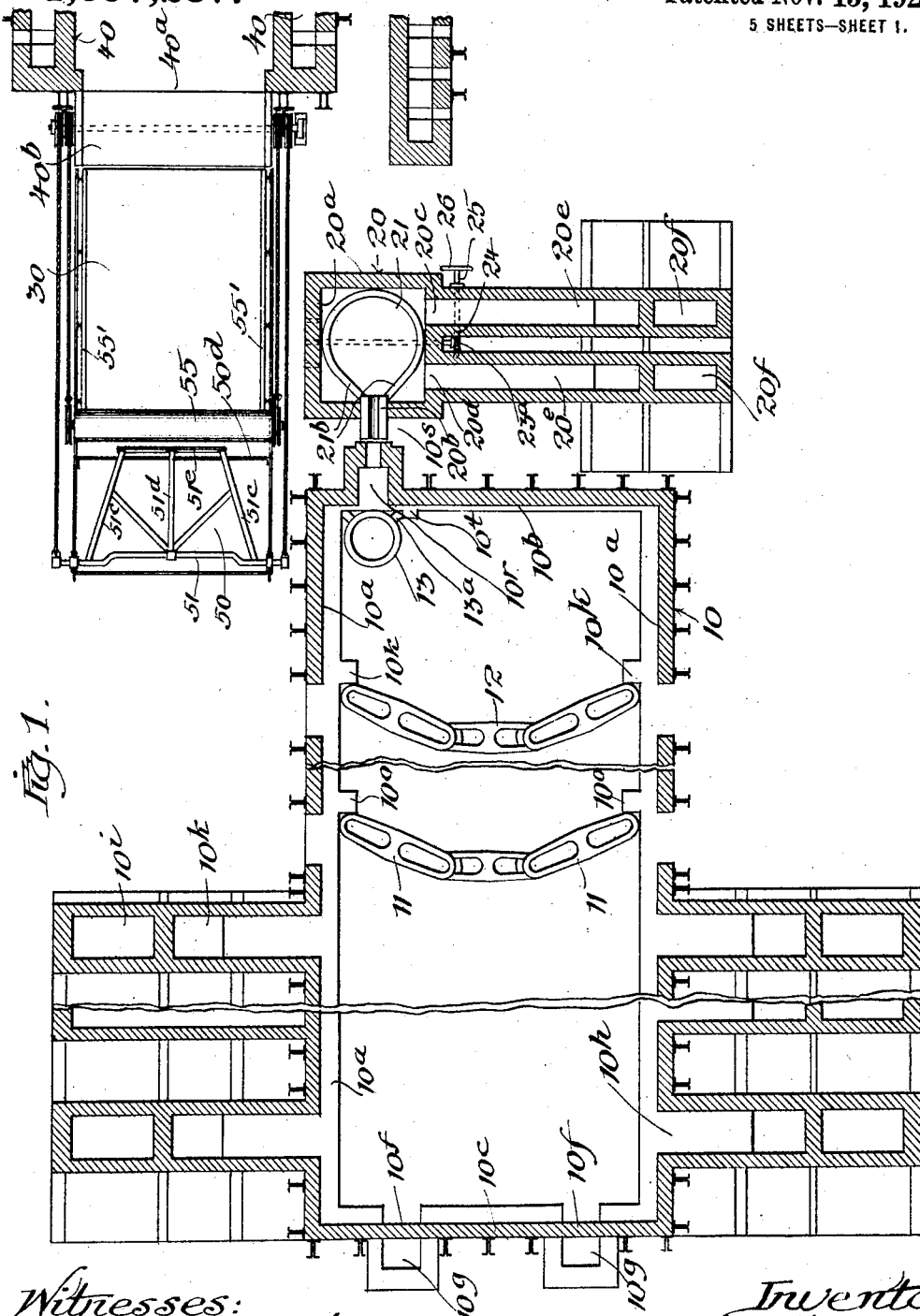

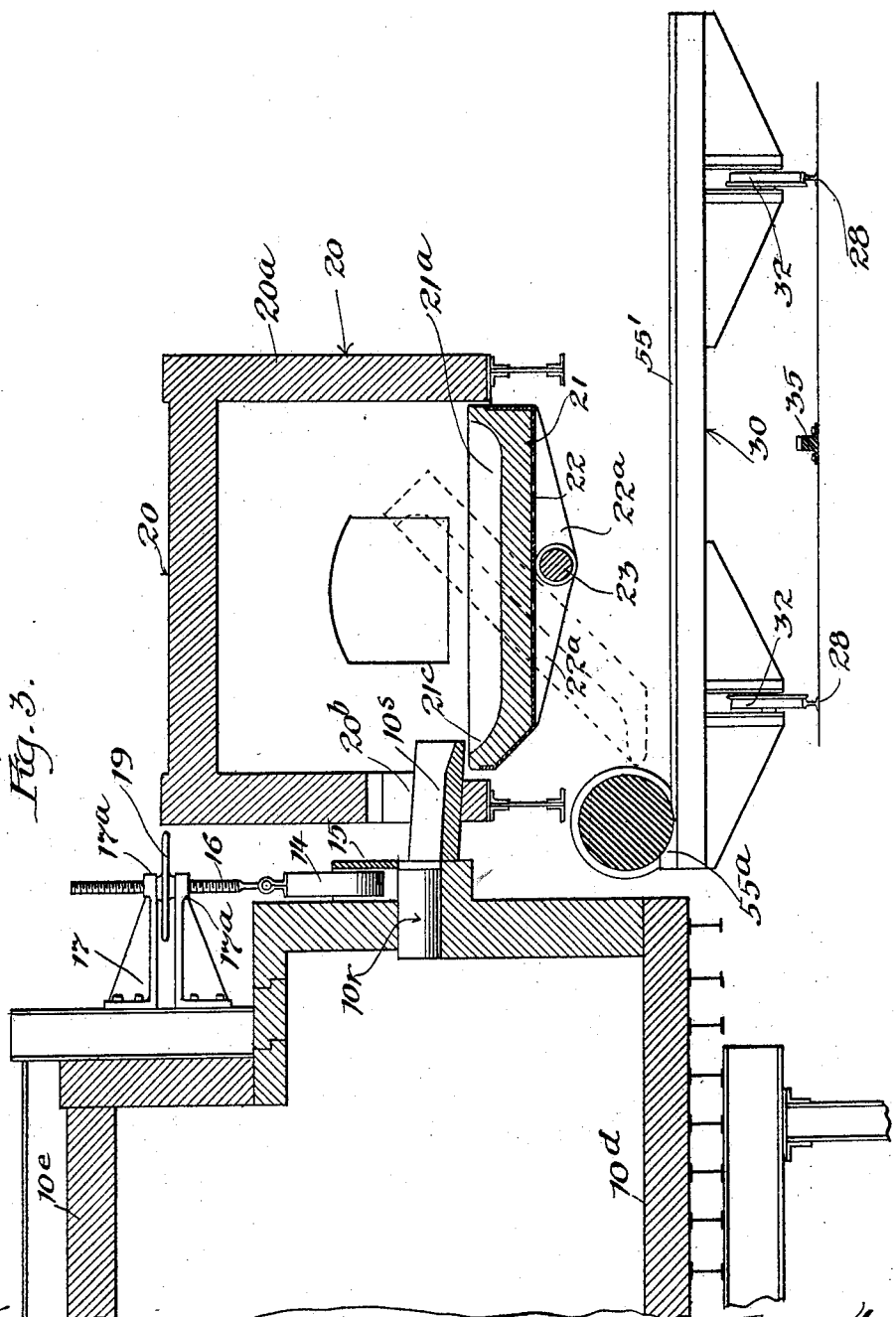

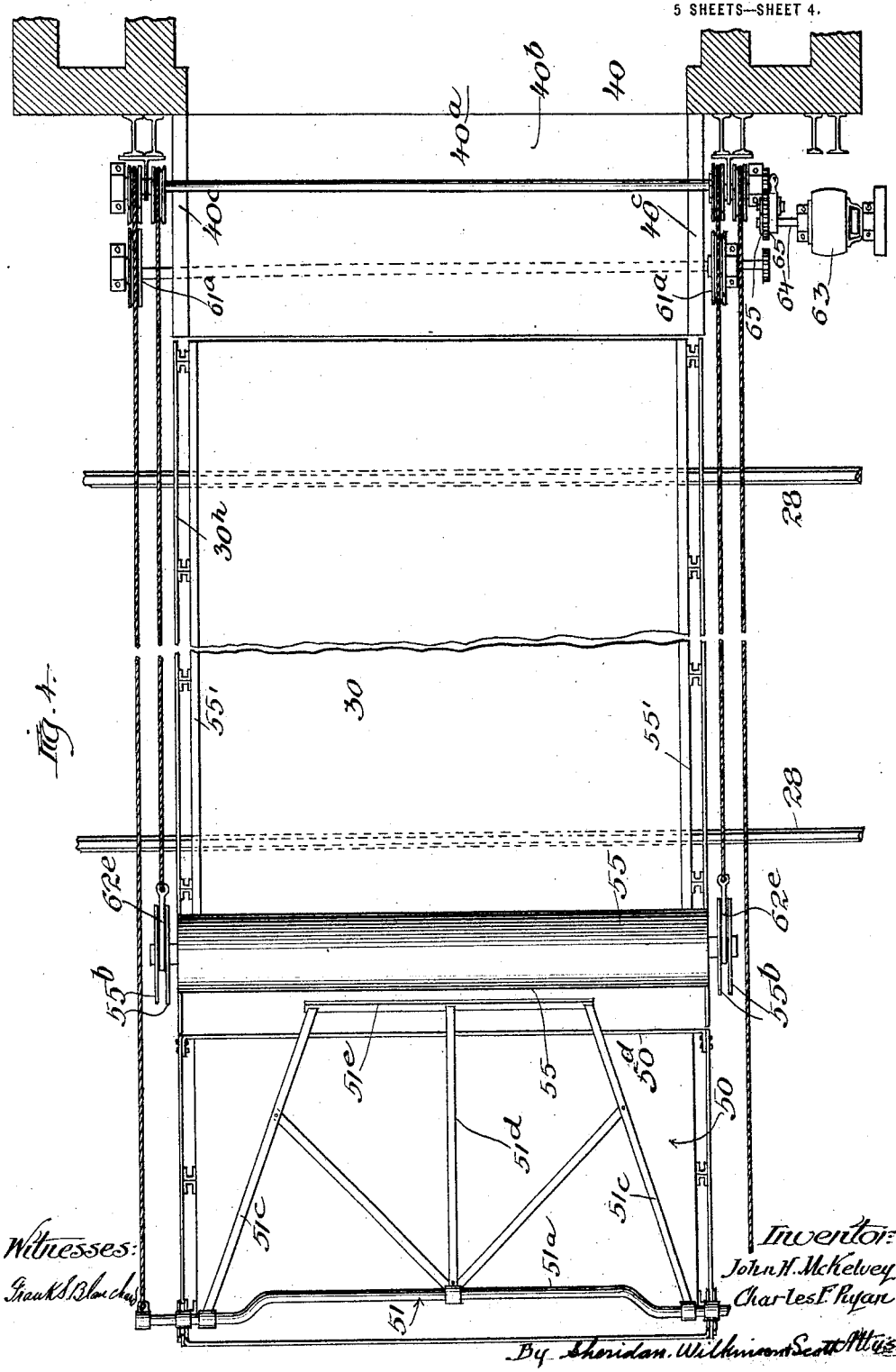

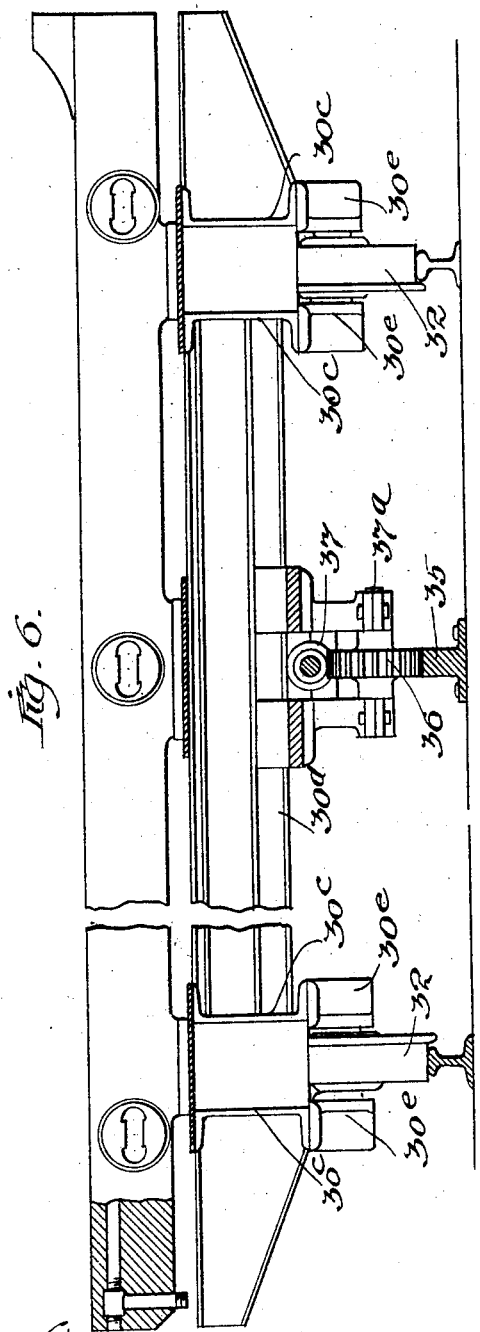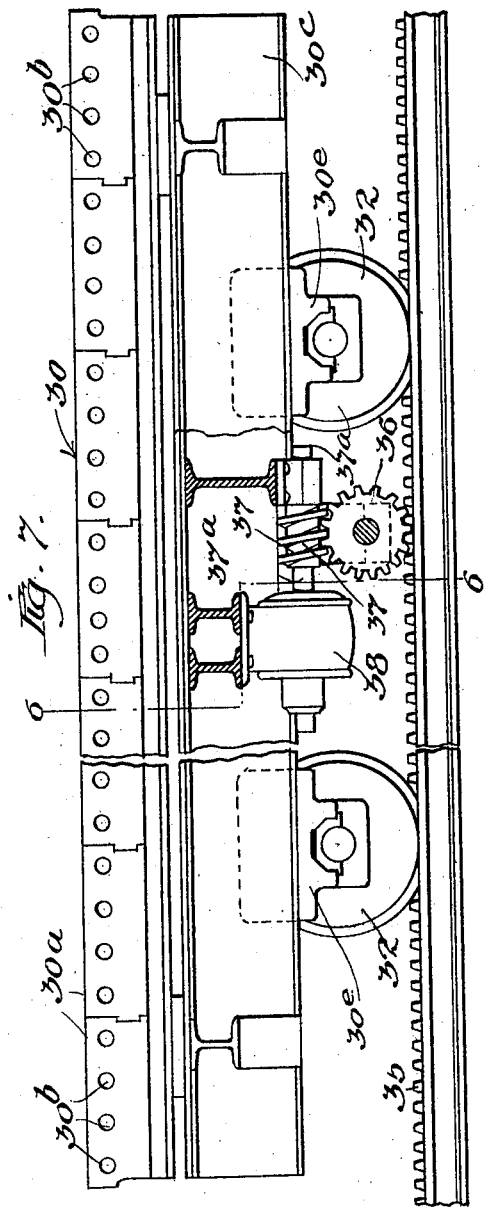

UNITED STATES PATENT OFFICE.

JOHN H. McKELVEY, OF KIRKWOOD, AND CHARLES F. RYAN, OF ST. LOUIS, MISSOURI.

PROCESS OF MAKING PLATE-GLASS.

1,397,287. Specification of Letters Patent. Patented Nov. 15, 1921.

Application filed April 12, 1915. Serial No. 20,861.

*To all whom it may concern:*

Be it known that we, JOHN H. MCKELVEY, a citizen of the United States, residing at Kirkwood, in the county of St. Louis and State of Missouri, and CHARLES F. RYAN, a citizen of the United States, residing at St. Louis and State of Missouri, have invented certain new and useful Improvements in Processes of Making Plate-Glass, of which the following is a specification.

This invention relates to improvements in processes for making plate glass. One object of this invention is to provide a process of manufacturing plate glass in which a continuous melting operation of the batch may be employed, and in which the molten glass may be efficiently, economically, and quickly handled from the time it is melted until the plate is placed in the leer.

Hitherto plate glass has been manufactured by placing a batch in melting pots or flasks situated, or located, in suitable furnaces for melting or fusing the constituents. As these constituents become melted it is generally the practice to add more of the batch to the pots,—this taking place several times in order to utilize, as nearly as possible, the full capacity of the flasks. After the glass is melted in the pots it is necessary to regulate the heat in the furnace to obtain the desired temperature, which is maintained for a considerable time to clear up or settle the molten glass or metal, as it is termed. Individual pots are then extracted from the furnace by means of tongs and conveyed to a second pair of tongs, by which they are conveyed to or adjacent the table, at which point the scum or impure matter floating on the surface of the molten glass is skimmed off and the bottom of the pots is also cleaned to prevent the possibility of any impurities, such as dirt, or the like, being commingled with the molten glass on the table on which it is poured or spread. After pouring, a heavy roller is passed across the table to roll the molten glass into a plate of the desired thickness. This plate is then pushed, or otherwise moved, into a leer which constitutes an annealing furnace for the glass.

In the practice of our improved process, we eliminate the use of flasks or pots and provide a continuously melting furnace, from which the glass is drawn or poured into a receptacle mounted in and forming part of an auxiliary chamber or furnace, where it may be properly and efficiently treated at the desirable temperature, after which it is deposited directly upon the table upon which it is to be rolled, and conveyed therewith and thereby to a position adjacent the leer where the rolling operation takes place, after which the plate is moved into the leer for annealing. It is generally necessary and advisable to maintain a heat in the auxiliary chamber considerably less than that of the furnace, although in some instances it may be highly advisable and necessary to heat such chamber and its contents to a point appreciably higher than that of the furnace. In either event, to produce a proper and satisfactory product by the use of our process and apparatus, we deem it highly essential to be able to control the heating of the chamber absolutely independently of the main heating furnace, so that we may carry on the desired heat treatment in this chamber at the proper degree of temperature without affecting in any way the furnace heat or without having to rely upon the furnace heat for such heat treatment.

The objects of our invention, and the process, as well as one form of apparatus intended to carry out our process, will be more clearly described in the following specification and the apparatus shown in the accompanying drawings, in which—

Figure 1 is a horizontal section through the apparatus;

Fig. 2 is a vertical transverse section through one of the combustion chambers, also showing a portion of the hearth and regenerative air and gas sections;

Fig. 3 is a vertical section of a portion of the melting furnace and the auxiliary furnace and table;

Fig. 4 is a plan view of the table showing the scraper, roller, and operating mechanism, the table being in position adjacent the leer, a portion of which is shown in section.

Fig. 5 is a side elevation of the table showing the scraper and rolling mechanism, and actuating means for both.

Fig. 6 is a side elevation, partially in section, of the table, showing the moving mechanism; and Fig. 7 is an end elevation of the table.

Like numerals refer to like elements throughout the drawings, in which 10 indicates generally the melting furnace comprising the side walls $10^a$, end walls $10^b$ and $10^c$, respectively, hearth or floor $10^d$, composed of suitable refractory blocks or the like, and the top 10$^e$. Suitable charging openings are provided in the end wall 10$^c$, the same being covered by arches 10$^f$,—see Fig. 1—and exteriorly of and adjacent the openings are dog houses or openings 10$^g$, into which the mixed batch is dumped. It is our practice to keep a constant supply of this batch in the dog houses 10$^g$, so as to substantially cover up the charging openings through which from time to time, as needed, charges of the batch may be pushed, or otherwise introduced into the furnace. Combustion chambers 10$^h$ are provided on each side of the furnace leading through the side walls 10$^a$, see Figs. 1 and 2. Leading to these combustion openings 10$^h$ are the gas and air ducts 10$^i$ and 10$^k$, respectively, leading from suitable checker work, generally indicated by numerals 10$^l$, 10$^m$. The checker work of each of these chambers is in communication with suitable air or gas openings, not shown, and in the operation of the furnace air and gas are mixed adjacent the combustion openings 10$^h$ on one side of the furnace, ignited in such openings, and the hot gases travel across the furnace to the openings on the other side, through which they exhaust. From thence they lead through the checker work, similar to that shown in Fig. 2, whereby it becomes heated, and at the conclusion of a certain period the air and gas is reversed and combustion takes place in the opposite side of the furnace, whereby the regenerative effect is obtained, as is well known to those skilled in this art, this series of regenerative operations needing no further description herein.

The batch introduced into the furnace becomes molten or fused, and gradually flows toward the opposite end of the furnace. Intermediate the extremities of the furnace are provided abutments 10$^o$ projecting from the side walls into the furnace, and a series of refractory blocks 11 having inter-fitting ends, as shown in Fig. 1, are provided. These blocks 11 have a total length greater than the width of the hearth or furnace and when assembled form a bowed chain or boom between the sides of the furnace; and, owing to their construction from refractory material, they will float on the surface of the molten glass, and the slight flow and pressure present will serve to maintain them in locked, assembled relation. They are submerged some distance below the surface of the molten glass, and also project some distance above, so that impurities and scum floating on the surface of the molten glass are prevented from flowing toward the discharge end of the furnace. A second set of abutments 10$^k$ may be provided near the discharge end of the furnace, and also we may provide a second set of interlocking blocks 12, in construction similar to blocks 11, thereby providing an additional refining or skimming operation. In the end wall 10$^b$ of the furnace is provided an outlet opening 10$^r$, communicating with a discharge trough 10$^s$. An abutment 10$^t$ is located adjacent the discharge opening 10$^r$ and projects into the furnace, as is shown in Fig. 1. A collecting ring or member 13, provided with flanges 13$^a$, is located in the furnace adjacent the discharge opening 10$^r$, the rings 13$^a$ coacting with one wall of the furnace and the abutment 10$^t$ to maintain the ring in proper position, and inasmuch as the latter is constructed of refractory material of less density than the molten glass, it will float on the latter and prevent, or substantially prevent, the flowing of impurities or scum out of the discharge openings 10$^r$. A gate valve 14 is provided at the communication of the discharge opening 10$^r$ with the trough 10$^s$, as is shown in Fig. 3, and the same may be raised or lowered to permit, prevent, or regulate the flow of molten glass into the trough 10$^s$, as will be apparent. This gate is concave on its lower portion to fit the rear periphery of the trough 10$^s$, and a strap 15 is provided to maintain the valve 14 in proper position. The block 10$^r$ is also provided with inwardly projecting shoulders at its outer end to assist in holding the valve against the flow of molten glass. A threaded rod 16 is pivotally attached to and extends upwardly from the valve 14 through a pair of apertured lugs 17$^a$ carried by a bifurcated bracket 17. Between these lugs, and threaded on the rod, is provided a hand wheel 19, the proper rotation of which will result in the raising or lowering of the rod 16 and gate 14.

An auxiliary furnace or chamber 20 is provided adjacent the discharge end of the furnace 10, the same comprising side walls 20$^a$ and top wall 20. A suitable inward opening 20$^b$ is provided in one of the side walls 20 through which projects the trough 10$^s$, as shown in Fig. 3. Intake and discharge openings 20$^c$, 20$^d$, respectively, are provided, the same being in communication with air and gas ducts 20$^e$, 20$^f$, respectively, which lead from suitable regenerative chambers, so that, as is customary with such furnaces, the direction of flow of the gas may be reversed at desired intervals to obtain a regenerative heating effect. The commingled gas and air will be ignited in the opening 20$^c$, for example, and flow around the auxiliary furnace 20 and out the discharge opening 20$^d$.

A collecting saucer or receptacle 21 is provided, the same constituting the bottom of the auxiliary furnace 20, and being dished or otherwise hollowed out, as indicated by numeral 21$^a$. This receptacle 21, preferably constructed as shown in Fig. 1, with the angularly disposed portions 21$^b$ leading to and forming the spout 21ᶜ, is located beneath the trough 10ˢ. The collecting saucer 21 proper is preferably formed of refractory material and is mounted in a cast-iron or other metal shell 22 which may be apertured for cooling and radiation. This shell 22 is provided with the transverse ribs 22ᵃ to which is attached the rock shaft 23. This shaft 23 is provided at one end with the worm gear 23ᵃ with which meshes a worm 24 carried on a shaft 25 to which in turn is secured a hand wheel 26. It is obvious that rotation of the latter in the proper direction will result in a tilting or partial rotation of the saucer 21, when it is desired to pour from the same.

Located beneath the auxiliary furnace 20 and extending a considerable distance to one side thereof are the tracks 28. A rolling table, generally indicated by numeral 30, is provided, the same comprising the compositely formed table proper, indicated by numeral 30ᵃ, the same being also provided with water or other fluid ducts 30ᵇ for cooling purposes. The table proper 30ᵃ is mounted upon beams 30ᶜ between which extend the cross beams 30ᵈ, forming a rigid and compact structure. Journal bearings 30ᵉ depend from and are secured to the beams 30ᶜ and in these journals are mounted the axles of wheels 32 which roll on tracks 28 of the table.

The rack 35 is provided between the tracks, see Figs. 6 and 7, and normally meshing with this rack is the pinion 36 mounted in suitable bearings carried by the table 30. Meshing with this pinion 36 is the worm 37 carried on shaft 37ᵃ arranged to be rotated by a suitable electric motor 38, or the like, this motor and worm being also suitably mounted on the underside of table 30. It will be apparent that proper rotation of the motor shaft 37ᵃ will result in rotation of pinion 36 and the latter coacting with rack 35 will operate to move the table in the desired direction to or from beneath the auxiliary furnace.

We also provide a leer or annealing furnace, generally indicated by numeral 40, the same being provided with a charging opening 40ᵃ adjacent which is provided a stationary table 40ᵇ, see Figs. 1 and 5. At each side of the stationary table 40ᵇ is provided an inclined block 40ᶜ, see Fig. 5. At the opposite end of the rolling table 30, when the same is in the position shown in Figs. 1 and 4, for example, is provided a stationary table 50 mounted on suitable legs 50ᵃ, as shown in Fig. 5. Projecting outwardly from each side of the table 50, and secured thereto, is a track guide 50ᵇ adapted, when in the position shown in Fig. 4, for example, to aline with tracks 30ʰ carried by the table 30. A scraper member, generally indicated by numeral 51, normally rests on and is supported by the table 50, as shown in Fig. 5, the latter being provided with an upstanding flange or wall 50ᵈ at the end adjacent the table.

The scraper 51 comprises a rear cross bar 51ᵃ from which extend converging bars 51ᶜ at the sides of the central bar 51ᵈ. Transverse braces extend between the central bar 51ᵈ and converging bars 51ᶜ, as shown in Fig. 4. The converging and central bars are attached to the scraper blade 51ᵉ and rest, when in inoperative position, on the wall 50ᵈ, as shown in Fig. 5. The cross bar 51ᵃ carries the depending legs 51ᶠ, in the lower extremities of which are rotatably mounted the rollers 51ᵍ, mounted on tracks 50ᵇ.

A pressing roller 55 is provided to form the plate, this roller in general practice being air-cooled, and resting against blocks or shoes 55ᵃ at one end of the table, as shown in Fig. 5. At the sides of the table are provided the spacing or gage strips 55ᵇ upon which rides the roller 55, the thickness of glass to be rolled being determined by these gage strips. When it is desired to roll or press out the molten glass the roller 55 is moved, as will be hereinafter described, from the position shown in Fig. 5, to the position indicated in dotted lines therein, partially up the inclined blocks 40ᶜ in which position they may be wedged or otherwise suitably retained until the glass plate has been removed from the table. To operate the roller 55 and scraper 51, we provide the following mechanism.

A trough or trench 60 is provided adjacent the rear and beneath table 40, in which trench are rotatably mounted the shafts 61, 62, see Fig. 5. Each of these shafts carries a pair of drums or winding pulleys 61ᵃ, 62ᵃ, respectively, and a gear 61ᵇ, 62ᵇ, respectively. A driving motor 63 is provided, the same having a suitable shaft 64 to which is attached the gear 65 meshing with a second gear 66 carried on an oscillatable handle 67. This latter may be moved to throw gear 66 into mesh with either gear 61ᵇ or gear 62ᵇ, as will be obvious. Cables or chains extend from around pulleys 61ᵃ to and over pulleys 61ᵈ mounted in brackets extending from the front of the leer to shackles or thimbles 61ᶜ mounted on the cross bar 51ᵃ of the scraper. Similarly, cables extend from around pulleys or drums 62ᵃ to and around pulleys 62ᵈ also carried by brackets extending outwardly from the front wall of the leer, these last named cables terminating in hooks 62ᵉ which may be slipped over the ends of the shaft of roller 55 between suitable guide disks 55ʰ, see Fig. 5, when it is desired to move the roller. It is obvious that with these hooks in engagement and the gears in mesh, as shown in Fig. 5, proper rotation of the motor 62 will draw the roller 55 across the table and up on inclined blocks 40°, as described above. At the completion of this operation the handle 67 may be swung over to enmesh gear 66 with gear 61ᵇ. Upon proper operation of the motor, the scraper 50 will be drawn across the table 30, the scraper blade 51ᵉ dropping into contact with the table and the plate thereon, as the arms 51ᶜ, 51ᵈ ride forwardly on upstanding flange or wall 50ᵈ, as will be apparent. Movement of this scraper across the table will result in pushing the last plate thereon off the table on to stationary table 40 and from thence into the leer.

Assuming that the apparatus is in proper condition and molten glass is contained in the furnace 10, our process of making plate glass with the above described apparatus is as follows:

The valve 14 is raised, whereupon molted glass will flow out through trough 10ˢ beneath the collecting ring 13 into the collecting saucer 21ᵃ, which is of sufficient size to contain a proper charge of molten glass. After sufficient of the molten glass has been drawn off, the valve 14 is moved to closing position cutting off the flow of glass. Heat may then be applied to the auxiliary chamber 20 for the necessary period and at the necessary temperature until the molten glass is of the proper consistency and homogeneity, or in other words, until it is properly teemed. By utilizing a dish or saucer of the nature shown and described, the surface exposed to the action of the settling or refining heat is comparatively great in proportion to the depth of the same, so that the settling or refining may be equably and rapidly performed as compared with the present day teeming performed with the use of the clay pots. Furthermore, the regulation of the heat in the teeming chamber of our apparatus is comparatively simple. When the glass has reached the proper condition in the collecting saucer 21 the lock shaft 23 is operated and the saucer tilted at desired speed. Previous to this it is to be understood that the table 30 has been moved to a position directly beneath the teeming furnace, the far end of the roller, as viewed in Fig. 5, being located beneath the spout 21ᶜ of the saucer 21. As this saucer is tilted by virtue of the location of its axis of rotation and its position close to the table it will deliver the molten glass close to and beneath the roller 55 and the table may be moved at the uniform rate from beneath the teeming furnace 20 toward the leer, this movement, when regulated in conjunction with the tilting of the saucer 21 by a skilled operator, resulting in the deposit of a uniform ribbon or mass of molten glass close to and partially beneath the roller 55 the entire width of the table. This simplifies and improves the rolling operation which next takes place after the table has been moved to the position shown in Fig. 4, for example. The hooks 62ᵉ may be attached to the ends of the roller shaft and gears 66 enmeshed with gears 62ᵇ, whereupon proper operation of the motor 63 will move the roller 55 across the table 30 resulting in the squeezing out of the glass plate. By this method of pouring and rolling, we obviate necessity for the greater portion of the manual distribution of the molten glass, so necessary in present day practice, as will be obvious. After the roller has moved up on blocks 40°, in which position it is free from the table, and in which position it may be retained by wedge blocks or the like, the gear 66 is thrown over into mesh with gears 61, as described above, and the scraper is moved across the table to push the glass plate therefrom into the leer, where it may be annealed or further treated.

By the use and practice of our improved method we are enabled to provide and utilize a continuous melting, eliminating the wear and breaking of the pots in the furnace, and also eliminating the great amount of handling and care necessary with the use of such pots. Furthermore, a much more consistent product is obtained by the use of the continuous melting. We also eliminate and do away with the necessity for removal and handling of the individual pots, and we provide an auxiliary furnace or chamber wholly independent of the original melting apparatus which not only enables us to utilize the continuous melting operation, but also enables us to more efficiently, rapidly and practicably refine or settle the molten glass, enabling us to secure a much better quality of glass and deposit it directly on the table at the proper and most desirable temperature for rolling.

It will also be apparent that, as stated above, we are enabled to deliver our molten glass in a uniform strip across the table, not only adjacent to, but beneath the roller, as will be apparent from an examination of the tilted position of the saucer 21, indicated in dotted lines in Fig. 3.

In addition to the above advantages we are enabled to quickly and efficiently roll the plate and remove the same therefrom into the leer, as described above.

It will be apparent that our process is susceptible of modifications and improvements, and we do not wish to be restricted to the same, as described above, beyond the scope of the appended claims.

What we claim is:

1. The process of making plate glass consisting in first melting the constituents in a furnace, tank, or the like, then conveying and segregating a portion of the molten glass in a collection chamber, then treating said portion by subjecting it to a heat independent of and controlled independently of said furnace for such period of time and at such temperature as to refine such portion, and thereafter depositing said molten glass directly upon a subjacent rolling table and finally rolling same.

2. The process of making plate glass consisting in first melting the constituents in a furnace, tank, or the like, then conveying and segregating a portion of the molten glass in a relatively shallow collection receptacle, then treating said portion by subjecting it to a heat independent of and controlled independently of said furnace for such period of time and at such temperature as to refine such portion, and thereafter depositing said molten glass directly upon a subjacent rolling table and finally rolling same.

In testimony whereof we have subscribed our names.

JOHN H. McKELVEY.
CHARLES F. RYAN.